Figure 1:
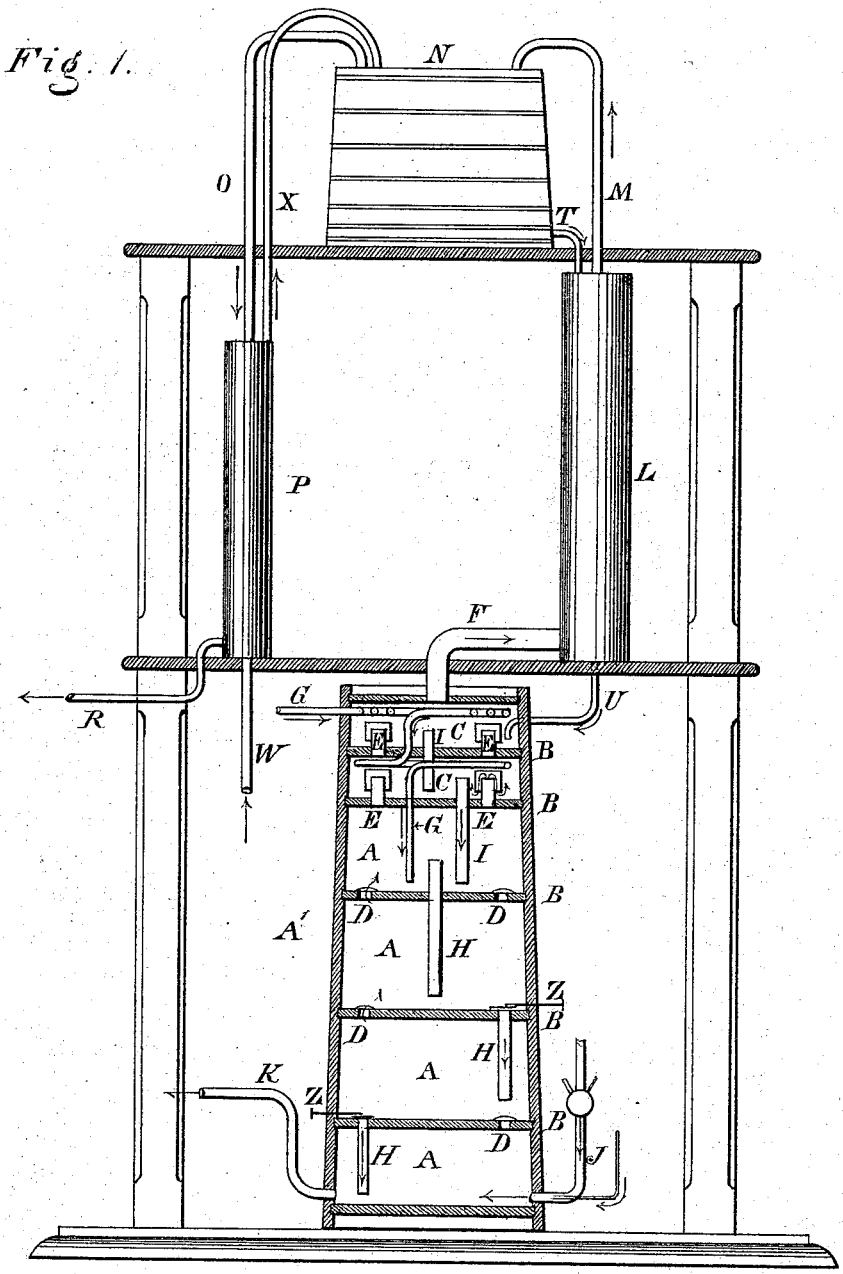

D. G. RUSH.
Combined Distilling Apparatus.

No. 156,948. Patented Nov. 17, 1874.

UNITED STATES PATENT OFFICE.

DAVID G. RUSH, OF CHICAGO, ILLINOIS.

IMPROVEMENT IN COMBINED DISTILLING APPARATUS.

Specification forming part of Letters Patent No. 156,948, dated November 17, 1874; application filed June 10, 1874.

CASE B.

*To all whom it may concern:*

Be it known that I, DAVID G. RUSH, of Chicago, county of Cook and State of Illinois, have invented a certain Improvement in Combined Distilling Apparatus, of which the following is a specification, reference being had to the accompanying drawing.

The object of my invention is to manufacture alcohol by distillation having a strength of ninety-six per cent. proof. The strength of the alcoholic spirit may be varied, and any desired proof of the spirit less than ninety-six per cent. may be obtained, at the pleasure of the distiller.

The distillation is effected by the direct application of steam to a thick fermented mash, wash, or beer, and the alcohol is obtained by a single operation or direct distillation, and the whole product derived from this manner of distillation is good commercial alcohol, there being no intermediate products derived, as by other modes of distillation, such as high wines and low wines, from which alcohol has generally been made by being redistilled one or more times. The beer is injected into and the alcohol flows from the apparatus simultaneously and uninterruptedly. The beer introduced must at all times be proportionate with the steam entering, so as to maintain a uniform distillation and pressure. There is less fuel required in completing the distillation of alcohol by a single vaporizing than by the processes in general use, which require the first products of distillation to be redistilled before the required strength is obtained.

The combined distilling apparatus is illustrated more in detail in the plan view, in which—

Figure 1 represents the combined apparatus, showing the internal parts or arrangements of the still A'.

A A A A are the lower chambers of the still, in which the beer is subjected to distillation, into the upper one of which the beer is charged and enters continuously. B B B B B are the bottoms separating the chambers. C C are the upper chambers, in which the return spirits from the column are revaporized. These upper chambers may be detached from the main still or become attached to the column. D D D D represent openings in the bottoms, with valves attached, so arranged as to allow the vapor to ascend through them, and also prevent the beer flowing down through the openings. E E E E represent devices known as plungers, and are used for the same purpose as the valves in the lower bottoms. F is a vapor-pipe which passes to L, which is an ordinary alcohol-column, in which the vapor ascends and passes through a succession of water-baths, and passes out through pipe M into N, which is an ordinary goose or wine-warming apparatus, in which water and impurities are separated from the alcoholic vapor, and are conveyed back into the column through pipe T. Pipe O conveys the concentrated or finished alcoholic vapor from the goose into P, which is a cooler or condenser, in which the vapor is condensed into a liquid. An ordinary worm will answer the same purposes of the condenser. R is the tail-pipe, through which the alcohol or spirits are conveyed to a receiving-tank. G G is a pipe, through which the beer is injected into the still. This beer-pipe enters the top chamber of the still, and is continued or coiled round in the upper part of the chamber, and is continued in like manner in the next chamber below, and then passes into the third chamber from the top, into which the beer is delivered. The beer-pipe is continued in the upper chamber for the purpose of heating the beer before it is exposed to distillation; but it may be introduced into the still cold. H H H are return or draw-down pipes, through which the beer passes from one chamber to the one next below to the bottom of the still, being detained and subjected to distillation in each chamber. Through the upper one of these pipes the beer flows spontaneously, but the lower two are closed by a gate or valve, Z Z, and are operated by the distiller in the ordinary way. I I are return-pipes, through which water and other impurities flow down and pass off with the beer, with which they mingle. J represents an exhaust-steam injector; but simple steam-pipes, such as are ordinarily used, will answer the same purpose. K is an ordinary discharge or blow-off pipe. V is a pipe, through which water is introduced into the cooler P, for the purpose of condensing the spirit vapor; and X is a pipe conducting the water after having passed through the cooler to the goose N. Water may be conveyed separately on the cooler and on the goose.

I do not claim anything embraced in the patent of Wm. Corfield, No. 85,287, for a distilling apparatus, in which the mash is heated at the top of the still, and the operation is such that the pressure and temperature are constantly changing instead of being uniformly maintained; but What I do claim is—

The combination of the compartments A A A A of the still, the vapor-chambers C C, the beer-induction pipe G, steam-injector J, and discharge K, with the column L, goose N, and worm P, all constructed, arranged, and operating in the manner and for the purpose specified.

DAVID G. RUSH.

Witnesses:
D. W. C. CASTLE,
J. W. JEFFERY.